3,164,574
ACRYLONITRILE VINYLSULFONIC ACID
COPOLYMERS
Josef Witte, Cologne-Stammheim, Germany, assignor to Farbenfabriken Bayer Aktiengesellschaft, Leverkusen, Germany, a corporation of Germany
No Drawing. Filed Nov. 8, 1960, Ser. No. 67,894
Claims priority, application Germany Nov. 11, 1959
1 Claim. (Cl. 260—79.3)

The present invention relates to copolymers of acrylonitrile and vinylsulfonic acid and the process of producing such polymers.

It is known that vinyl sulphonic acid and the alkali metal salts of vinyl sulphonic acid readily polymerise in aqueous solution. It is also possible easily to prepare copolymers of such compounds with water-soluble monomers, for example acrylic acid or acrylamide, the polymers of which are likewise water-soluble. Copolymerisation with monomers which are sparingly soluble or insoluble in water, for example styrene or acrylonitrile, on the other hand, is either completely unsuccessful in aqueous medium or the copolymers contain only a fraction of the vinyl sulphonic acid. For example, if acrylonitrile is polymerised in the presence of vinyl sulphonic acid or alkali metal vinyl sulphonates in such a quantity of water that a homogeneous solution of both components is present, there is obtained a water-insoluble copolymer which contains only a small proportion of the vinyl sulphonic acid supplied. With a measured addition of acrylonitrile to an acrylonitrile-vinyl sulphonic acid polymerisation batch, products, which are completely insoluble in water or perhaps softenable to a certain extent, are obtained both with low and high vinyl sulphonic acid contents in the copolymer, this having been described in a work by D. S. Breslow and A. Kutner, Journ. Polym. Sci. XXVII (1958) pages 299–300.

The present invention has, as one of its main objects the production of new copolymers of acrylonitrile or methacrylonitrile and high proportions of vinylsulfonic acid, said copolymers being soluble in water or forming stable dispersions in water.

Other objects of the invention will be apparent to those skilled in the art from the description and examples which follow.

In accordance with the present invention, it has been established that copolymers on the basis of acrylonitrile and methacrylonitrile which are soluble in water or which form stable dispersions in water are obtained in good yields from acrylonitrile or methacrylonitrile, i.e. largely water-insoluble monomers, and vinyl sulphonic acid or a water-soluble salt of said acid, said copolymers having incorporated therein at least 30 percent of vinyl sulphonic acid, if the polymerisation commences by means of radical forming catalysts in aqueous medium at temperatures of at least 20° C. with a total monomer concentration of at least 45 percent and, as the polymer concentration increases during the polymerisation, only such a quantity of water is added that thorough mixing still remains possible.

The copolymers according to the present invention contain either acrylonitrile or methacrylonitrile or both components simultaneously as the substantially water-insoluble monomer component.

Apart from acrylonitrile alone, it is also possible to use mixtures of the latter with other ethylenically unsaturated monomeric compounds, advantageously those of which the corresponding homopolymers are soluble in water, for said copolymerisation process. Mentioned as examples of monomers of this type are: acrylamide, methacrylamide, acrylic acid, methacrylic acid, styrene sulphonic acids and vinyl pyrrolidone.

The ethylenically unsaturated monomeric compounds hereinbefore referred to can replace the acrylonitrile or methacrylonitrile except for a residual content of 5 percent of acrylonitrile, preferably said third ethylenically unsaturated monomers (the polymer of which are water-soluble) can replace the acrylonitrile in amounts of about 20 to 60 percent.

On the other hand, vinyl sulphonic acid and perhaps vinyl sulphonic acid derivatives which are derived from said parent substance, for example by substitution of a vinyl group-hydrogen atom by a saturated aliphatic alkyl radical having 1–5 carbon atoms which can be branched or straight-chained, can be used as copolymerisation components; also suitable are water-soluble salts of vinyl sulphonic acid, for example of the alkali metal salts, such as sodium, potassium, ammonium, and also of the alkaline earth metal salts, such as calcium, strontium and barium, preference being given to the salts of the alkali metals or the ammonium salt.

The quantitative ratios to be considered for the vinyl sulphonic acid and acrylonitrile monomers, to be introduced, can in practice be at any desired ratio from a vinyl sulphonic acid proportion of 30% and upwards, i.e. between 30 and 99 percent, preferably 50 and 70 percent. The proportion of acrylonitrile can be replaced in any ratio between 0 and 100% by methacrylonitrile.

High-energy radiations or the compounds which are usual for polymerisation processes of this type and which readily decompose into radicals can be used as catalysts for the present process. Mentioned as examples are: organic peroxide compounds, such as acyl peroxides, for example benzoyl peroxide, acetyl peroxide, lauroyl peroxide and 2,4-dichlorobenzoyl peroxide, and also mixed diacyl peroxides (such as acetyl benzoyl peroxide and propionyl benzoyl peroxide), alkyl peroxides, such as tert.-butyl hydroperoxide, cumene hydroperoxide, methane hydroperoxide, tert.-amyl peroxide and tert.-butyl hydroperoxide, ketone peroxides, such as methyl ethyl ketone peroxide, and also inorganic per compounds, such as potassium or ammonium persulphates, hydrogen peroxide or percarbonates, such as diethyl percarbonate and dipropyl percarbonate, alkali metal percarbonates, and also alkali metal perborates and alkali metal perphosphates. These compounds capable of easily decomposing into radicals are used in quantities usual with polymerisation processes of similar type, i.e. in quantities from 0.1 to 5 percent, based on the total amount of the monomers employed. The inorganic or organics per compounds can be used in this way in combination with reducing agents in a manner known per se. Suitable reducing agents are for example sodium pyrosulphite or sodium bisulphite as well as sodium formaldehyde sulphoxylate, sodium thiosulphate or potassium bisulphite. The aforesaid reducing agents are advantageously used in quantities of 0.01 to 10 percent, based on the monomer, the ratio between oxidising agent and reducing agent advantageously being in the limits between 10:1 and 1:10.

According to one typical form of the process according to the invention, water-soluble peroxide compounds, such as an alkali metal or the ammonium salt of peroxidisulphuric acid or Redox systems thereof with sulphur compounds of low oxidation stage, (such as sodium pyrosulphite or potassium bisulphite), are employed, if necessary in the presence of small quantities, (i.e. quantities from 0.01 to 0.1%, related to the quantity of peroxide used), of heavy metal ions for example iron or copper ions.

In principles, emulsifiers of various types, i.e. both anionic and cationic or even non-ionic emulsifiers, can be used for the copolymerisation process according to the invention, but such a precaution is generally superfluous.

The reaction medium in the polymerisation process according to the invention is preferably adjusted to a pH value of 3 to 6.

For carrying out the copolymerisation in accordance with the present invention, a highest possible total monomer concentration is used throughout the entire polymerisation reaction. By this, there is to be understood that the polymerisation is commenced with a total monomer concentration which can be between 45% and 70% and is advantageously more than 50%. Since the small quantity of water used is in most cases not sufficient to dissolve the total quantity of acrylonitrile, it is necessary to ensure thorough mixing in order to obtain homogeneous copolymers. For this purpose, it is necessary, because of the viscosity rising with increasing polymerisation concentration, to add such a quantity of water gradually that a thorough mixing still remains possible. The latter is achieved by controlling the addition of water in such a way that a water content not exceeding a maximum of 75% is obtained at the end of the polymerisation reaction.

In one preferred form of the invention, which renders possible a satisfactory control of the heat of polymerisation being liberated, some of the monomer, water and catalyst is initially supplied and heated to reaction temperature. That part of the total monomer quantity which is present in the polymerisation vessel at the start of polymerisation is preferably $\frac{1}{10}$ to $\frac{1}{20}$ of the total. As soon as polymerisation has commenced, the main proportion of the monomer and of the water, and also a quantity of catalyst corresponding to the quantity of monomer, are continuously introduced into the reaction vessel. The reaction velocity is so regulated by the continuous addition of the residual monomers that the reaction temperature provided can easily be maintained. On completing the addition, there is only to be added dropwise such a quantity of water that thorough mixing just remains possible. During the polymerisation, a temperature higher than 20° C. and preferably from 50 to 70° C. is maintained. In certain cases, it is also possible to use higher reaction temperatures, for example up to about 100° C., but working under pressure is recommended. The polymerisation reaction is preferably carried out in an inert gas atmosphere, such as nitrogen or one of the inert gases.

Depending on the purpose of use, the products obtained by the process can be further employed just as they are formed. Where isolation is desired, it is possible to precipitate the polymers by adding low aliphatic saturated alcohols, such as methanol, ethanol and propanol but preferably methanol. A precipitation of the polymer can generally be achieved with about three times the volume of alcohol. A combination of the resulting copolymers with conventional processing auxiliaries, such as stabilisers, is also readily possible.

According to the present process, copolymers are obtained which are satisfactorily soluble in water when having a content of copolymerised vinyl sulphonic acid of about 65 percent. Copolymers of said type having sulphonic acid contents between 30 and 65% are obtained in form of aqueous dispersions. By the features disclosed above, it has become possible almost completely to suppress a homopolymerisation of the acrylonitrile to water-insoluble products, which homopolymerisation precedes the copolymerisation of the components. The copolymers according to the invention can be used for many puropses, for example for textile finishing, as a thickening agent or as soil-improving agents. They are also excellently suitable for the production of acrylonitrile polymers which can be satisfactorily dyed, these polymers being prepared by the processes described in copending United States patent application, Serial No. 861,229, filed on December 22, 1959 (now abandoned) and copending United States patent application Serial No. 54,363, filed on September 7, 1960. Copolymers of acrylonitrile and vinyl sulphonic acid with a vinyl sulphonic acid content of about 30 to 50 percent are soluble in dimethyl formamide, dimethyl sulphoxide and similar solvents, and are suitable as additives to spinning solutions of polyacrylonitrile in the said solvents according to a process described in German patent application F29254IVb/29b and in corresponding Belgian Patent No. 594,465.

The parts indicated in the following examples are parts by weight, unless otherwise indicated.

The percentages mentioned in the foregoing description are by weight unless otherwise indicated.

*Example 1*

10 parts of a 47% aqueous solution of sodium vinyl sulphonate and 0.7 part of potassium persulphate are placed in a stirrer-type vessel from which the air has been removed by means of nitrogen and are heated to 70° C. While stirring, 96 parts of a 47% aqueous sodium vinyl sulphonate solution, adjusted to pH=6, and 20 parts of acrylonitrile, are added dropwise within half an hour. Another 0.7 part of potassium persulphate, dissolved in 100 parts of water, is now added dropwise over a period of 1 hour, whereafter stirring is continued for 18 hours at 70° C. A highly viscous polymer solution has formed. The polymer is precipitated with 3 times the quantity of methanol, washed with methanol and dried. 65 parts of a water-soluble copolymer are obtained.

*Analysis.*—Found: N, 5.85%; S, 16.35%.

This corresponds to 22.2% of acrylonitrile and 6.4% of sodium vinyl sulphonate. The initial ratio corresponds to a content of 28.6% of acrylonitrile and 71.4% of sodium vinyl sulphonate.

Comparison experiment:

265 parts of water, 40 parts of solid sodium vinyl sulphonate and 16.1 parts of acrylonitrile are initially placed in a stirrer-type vessel from which the air has been removed with nitrogen. The solution was adjusted with sulphuric acid to a pH value of 5 and heated to 50° C. After adding 1.1 parts of potassium persulphate and 0.57 part of sodium pyrosulphite, the reaction mixture was kept for 18 hours at 50° C. while stirring constantly. A white polymer precipitated, which was filtered with suction, washed and dried. The yield was 14 parts, corresponding to 25%.

*Analysis.*—Found: N, 22.1%; S, 2.35%.

This corresponds to 83.5% of acrylonitrile and 9.5% of sodium vinyl sulphonate. The initial ratio corresponded to a content of 71.4% of sodium vinyl sulphonate and 28.6% of acrylonitrile.

*Example 2*

Using a procedure similar to that of Example 1, 35 parts of acrylonitrile were copolymerised with 105 parts of a 47% aqueous solution of sodium vinyl sulphonate, a highly viscous dispersion being formed. The copolymer was precipitated and washed with methanol. After drying, 75 parts of a colourless material which could be dispersed in water were obtained.

*Analysis.*—Found: N, 12.56%; S, 10.7%.

This corresponds to a content of 44.8% of acrylonitrile and 43.5% of sodium vinyl sulphonate.

*Example 3*

15 parts of a 52% aqueous solution of ammonium vinyl sulphonate and 0.5 part of ammonium persulphate are placed in a stirrer-type vessel from which the air has been removed by means of nitrogen and are heated to 60° C. While stirring, 100 parts of a 52% aqueous ammonium vinyl sulphonate solution, adjusted to pH=5.5 and 15 parts of acrylonitrile are added dropwise within 40 minutes. Another 1.0 part of ammonium persulphate, dissolved in 100 parts of water, is now added dropwise over a period of 1½ hours, whereafter stirring is continued for 12 hours at 65° C. A highly viscous polymer solution has formed. The polymer is precipitated with 5 times the quantity of ethanol, washed with ethanol and dried. 63 parts of a water-soluble copolymer are obtained.

*Example 4*

20 parts of a 50% aqueous solution of sodium vinyl sulphonate and 1.0 part of potassium persulphate and 0.5 part of $Na_2S_2O_4$ are placed in a stirrer-type vessel from which the air has been removed by means of nitrogen and are heated to 40° C. While stirring, 80 parts of a 50% aqueous sodium vinyl sulphonate solution, adjusted to pH=4.5 and a mixture of 40 parts of acrylamide, 10 parts of acrylonitrile and 100 parts of water are added dropwise within 2 hours. Another 0.5 part of potassium persulphate and 0.25 part of $Na_2S_2O_4$, dissolved in 50 parts of water, is now added dropwise over a period of ½ hour, whereafter stirring is continued for 7 hours at 80° C. A highly viscous polymer solution has formed. The polymer is precipitated with 4 times the quantity of methanol, washed with methanol and dried. 87 parts of a water-soluble copolymer are obtained.

*Example 5*

Using a procedure similar to that of Example 4, 30 parts of acrylonitrile and 30 parts of acrylamide and 100 parts of water were copolymerised with 89 parts of a 45% aqueous solution of sodium vinyl sulphonate, a highly viscous dispersion being formed. The copolymer was precipitated and washed with methanol. After drying, 86 parts of a colorless material which could be dispersed in water were obtained.

*Example 6*

98 parts by weight of a copolymerisation product obtained by copolymerising 95 parts by weight of acrylonitrile and 5 parts by weight of acrylic acid methyl ester are mixed in form of a dispersion (as obtained by copolymerisation of said components in water) with 15 parts by weight of a dispersion containing 2 parts by weight of a copolymerisation product as obtained by copolymerisation process according to Example 2. The mixed dispersion of these copolymers is filtered and 10 parts by weight of the mixture of these copolymers are dissolved in 90 parts by volume of dimethylformamide. Fibres produced by applying such a spinning solution show a dye absorption surpassing dye-absorption of fibers obtained in analoguous manner but without employing said vinylsulphonic acid copolymerisation product by about 70 percent. Furthermore, velocity of dye absorptions proves doubled.

What I claim is:

Water-soluble copolymers of acrylonitrile and at least 65% by weight of vinylsulfonic acid.

References Cited in the file of this patent

UNITED STATES PATENTS 2,300,920  Heuer _____ Nov. 3, 1942
2,783,212  Schnell _____ Feb. 26, 1957

OTHER REFERENCES

Breslow et al.: Journal of Polymer Science XXVII, January (1958), pages 299–300.